Figures 1, 5:
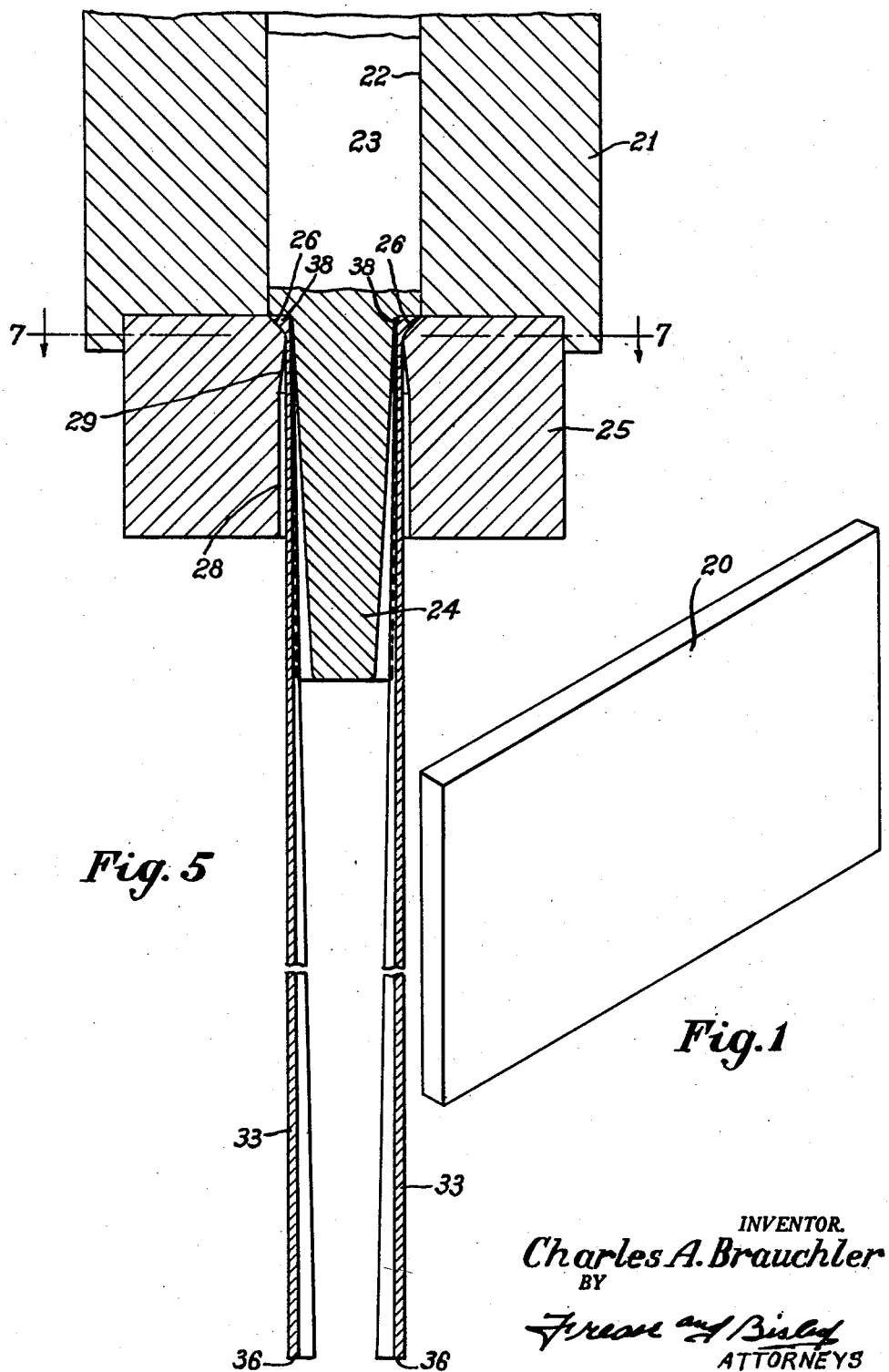

June 20, 1950 — C. A. BRAUCHLER — 2,512,264
METHOD OF MAKING PROPELLER BLADES
Filed Oct. 6, 1948 — 6 Sheets-Sheet 1

INVENTOR.
Charles A. Brauchler
BY
ATTORNEYS

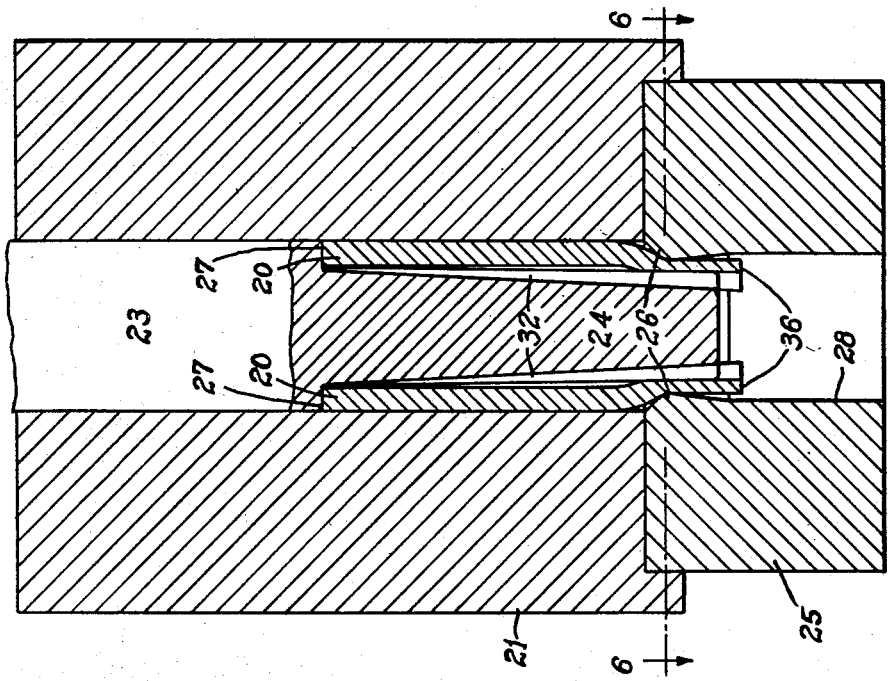
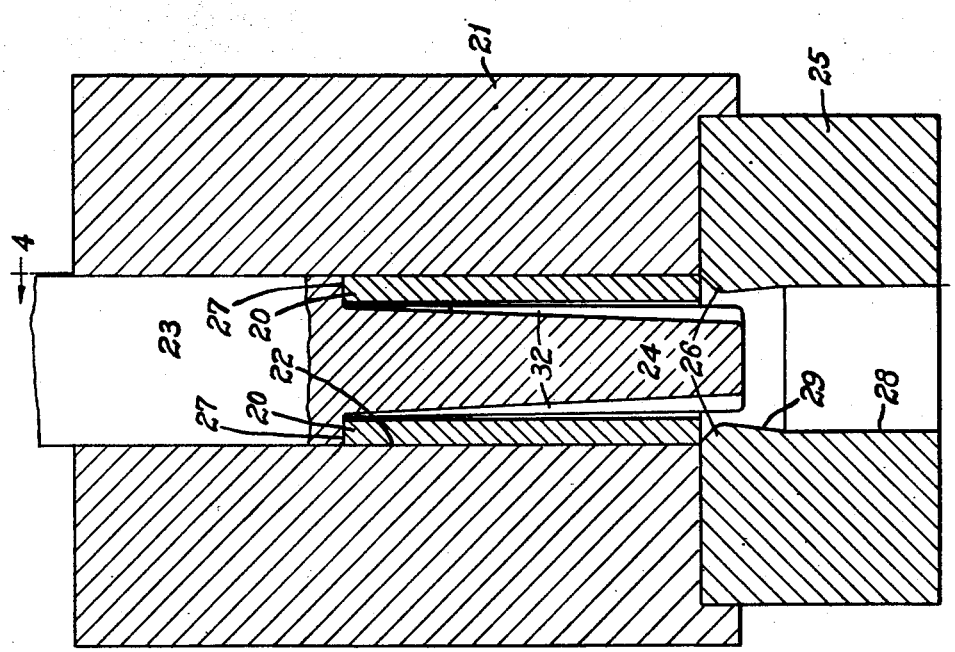

June 20, 1950  C. A. BRAUCHLER  2,512,264
METHOD OF MAKING PROPELLER BLADES
Filed Oct. 6, 1948                                6 Sheets-Sheet 3

INVENTOR.
Charles A. Brauchler
BY
Frease and Bishop
ATTORNEYS

June 20, 1950  C. A. BRAUCHLER  2,512,264
METHOD OF MAKING PROPELLER BLADES
Filed Oct. 6, 1948  6 Sheets—Sheet 4

INVENTOR.
Charles A. Brauchler
BY
ATTORNEYS

June 20, 1950　　　C. A. BRAUCHLER　　　2,512,264
METHOD OF MAKING PROPELLER BLADES
Filed Oct. 6, 1948　　　　　　　　　　6 Sheets-Sheet 5
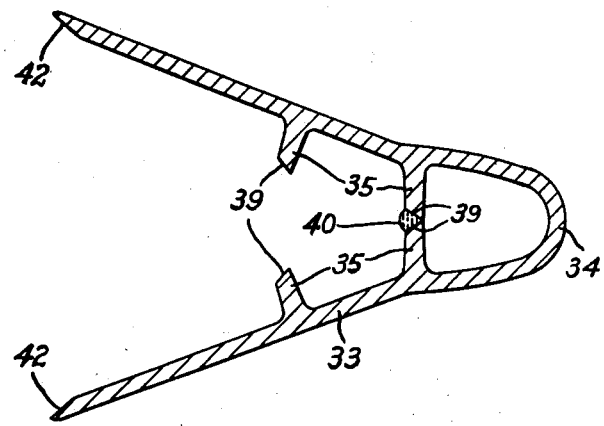
Fig. 9
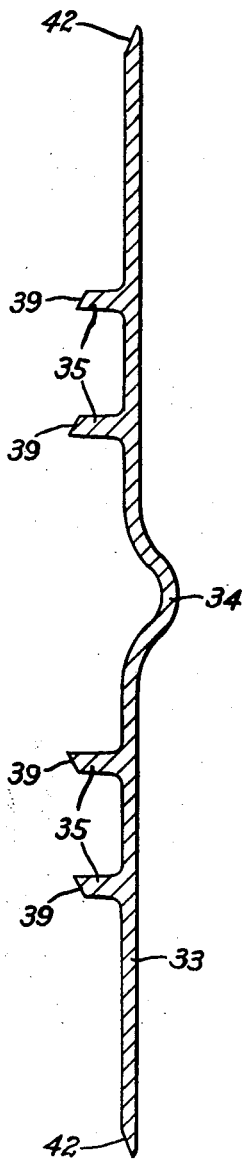
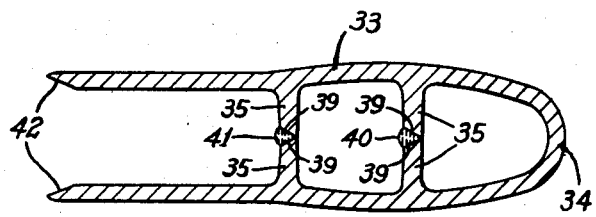
Fig. 10
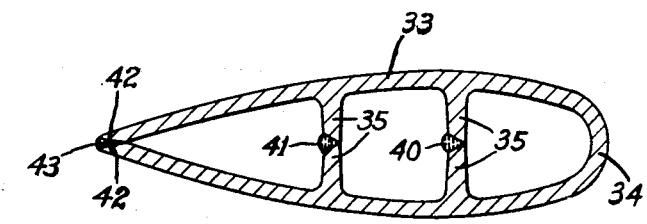
Fig. 11
Fig. 8
INVENTOR.
Charles A. Brauchler
BY
Frease & Bishop
ATTORNEYS

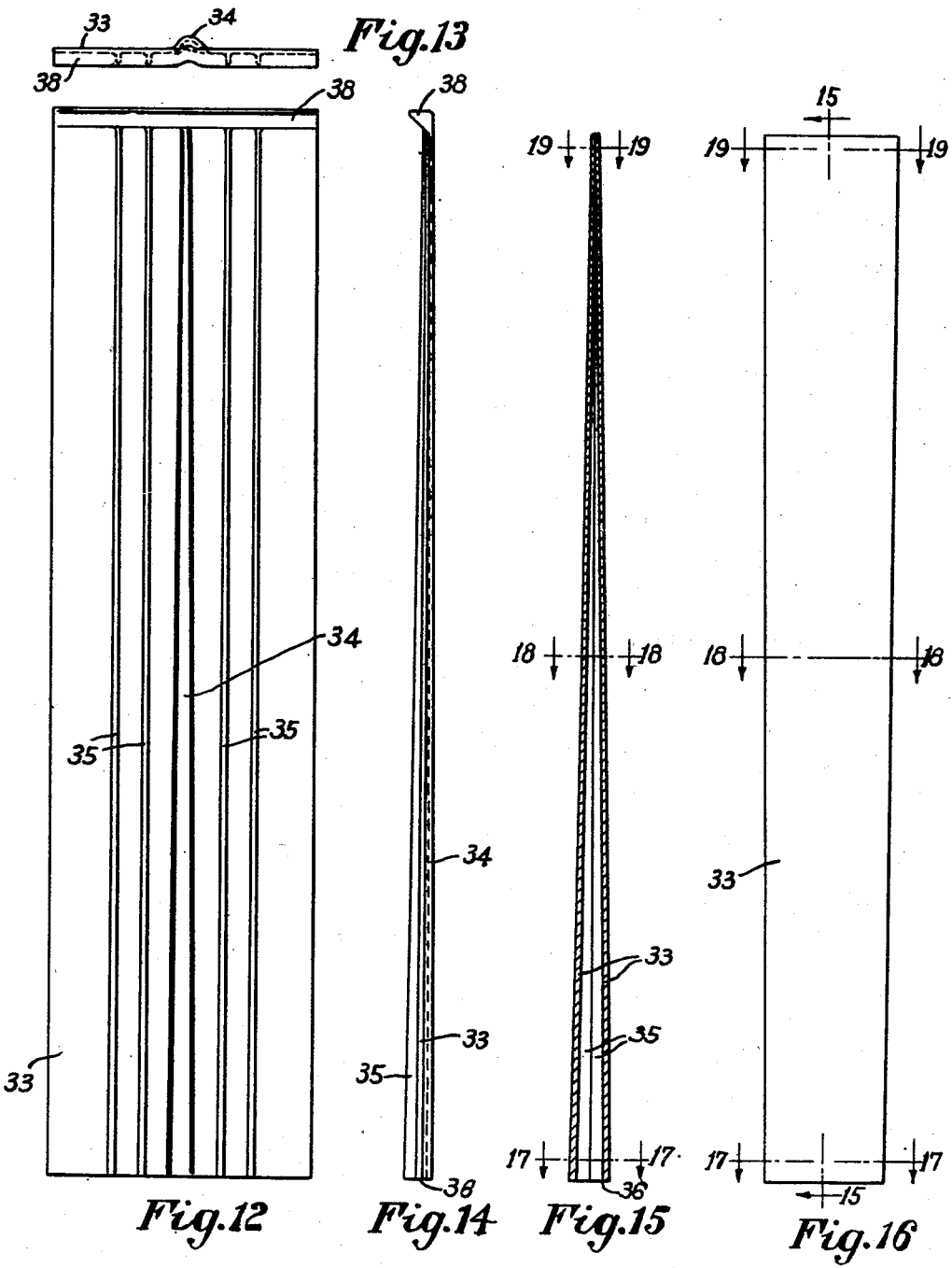

Patented June 20, 1950

2,512,264

UNITED STATES PATENT OFFICE 2,512,264

METHOD OF MAKING PROPELLER BLADES

Charles A. Brauchler, Canton, Ohio

Application October 6, 1948, Serial No. 52,995

2 Claims. (Cl. 29—156.8)

The invention relates to the manufacture of hollow, metal propeller blades by extrusion forging and welding operations.

Under present practice, hollow metal propeller blades are being made from metal plates which are machined so as to be uniformly tapered in wall thickness from one end toward the other after which tapered ribs are welded upon one side of the tapered plate.

Two of these plates are then placed together, with the edges of the ribs contacting each other and welded together, and the edges of the two plates are welded together to form the leading and trailing edges of a hollow blade of increasingly flatter elliptical cross sectional area from the shank end toward the tip end thereof.

This is a very costly method of producing such hollow propeller blades, particularly the large blades used in the propellers for large bombing planes, and adds greatly to the cost of the plane. In actual practice the cost of a single blade is about $4,000.00 as produced under the present practice and with three blades for each of the four propellers upon a superfortress, which is at present becoming obsolete, the cost of the propeller blades alone for such a plane is considerable, and with the new larger bombers now being produced, and having six engines, each with a three-blade propeller, it will be seen that the cost of the propeller blades alone is very considerable, and furthermore this method of producing propeller blades is very slow and tedious.

The present invention contemplates the manufacture of hollow propeller blades by extrusion and forging operations which may be carried out in a small fraction of the time now required for making such blades under present practice and at a small fraction of the cost thereof.

It is an object of the invention to provide a method of making a hollow propeller blade made of a tapered metal plate forged from a bar or billet by an extrusion process.

Another object is to provide a method of forming such a propeller blade by first extruding a tapered plate, of desired length and cross sectional area from a bar or billet, and then deforming the plate to produce the finished propeller blade of desired cross sectional shapes throughout its length.

A further object is to provide such a method in which the deforming or flattening of the tubular propeller blade is progressively increased from the shank end toward the tip end of the blade.

A still further object is to provide such a method in which the tip end of the tubular blade is entirely flattened and welded together.

Another object is to provide a method of forming a propeller blade from an extruded, tapered plate having tapered ribs upon one side of the plate adapted to be welded together to form a longitudinal reinforcement throughout the length of the blade.

A still further object is to provide a method of making a propeller blade of this type in which the extruded plate has a longitudinally extending, transversely arcuate bend throughout its median line to form the leading edge of the completed propeller blade.

Another object is to provide a method of making a hollow blade by forming a uniformly tapered plate, having an arcuate, longitudinal bend at its median line and equally spaced pairs of longitudinal ribs upon opposite sides of said bend on one side of the plate, and then deforming the plate to form a propeller blade by bending the plate on each side of said longitudinal bend until the first pair of ribs contact with each other, then welding the contacted ribs together, then further bending the plate until the second pair of ribs contact with each other and welding these ribs, and then further bending the edge portions of the plate into contact with each other and welding the contacting edge portions to form the trailing edge of the propeller blade.

Figure 4:
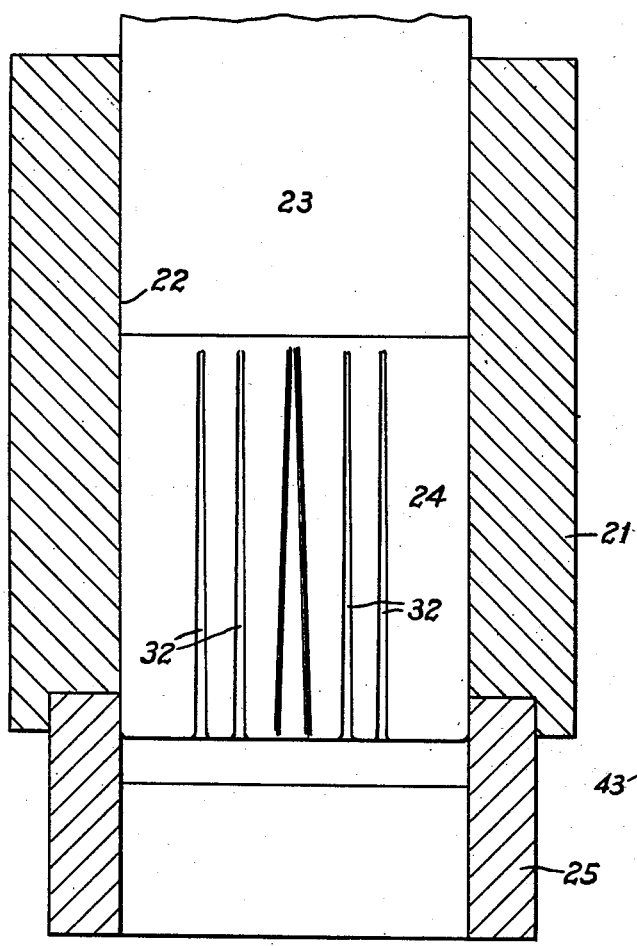
Figure 17:
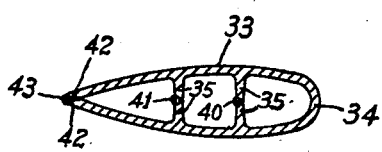
Figure 18:
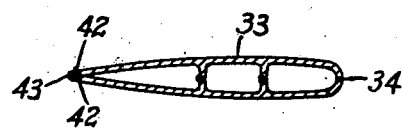
Figure 6:
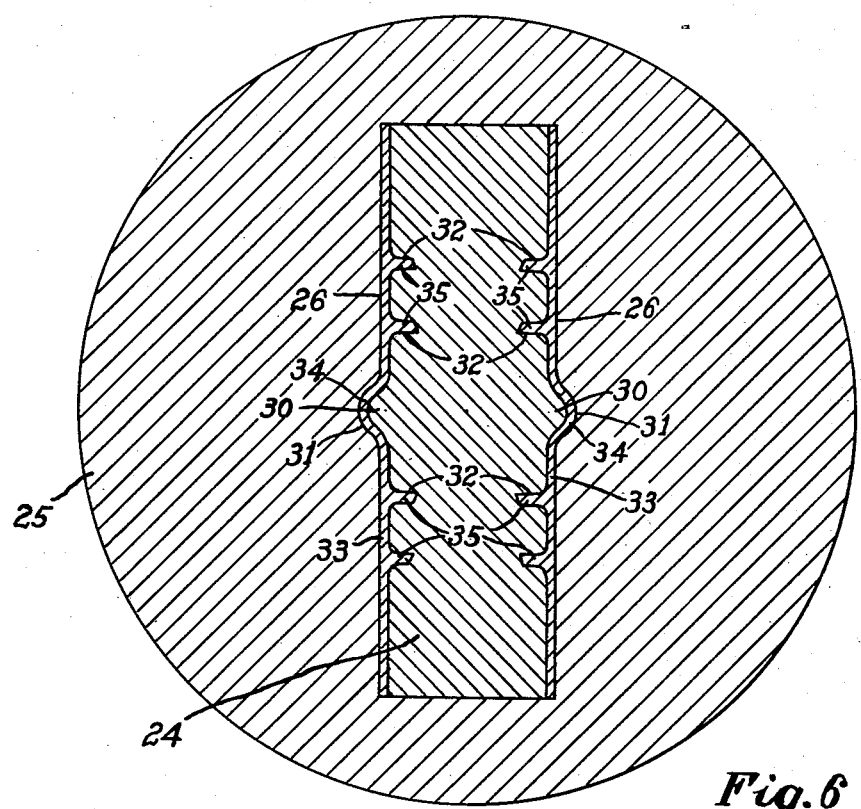
Figure 7:
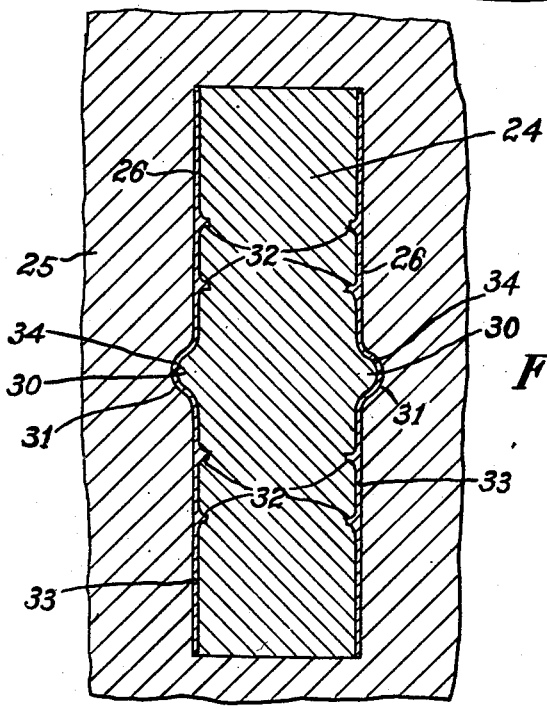

The above and other objects, apparent from the drawings and following description, may be attained, the above described advantages and results obtained by the construction, arrangement and combinations, sub-combinations and parts and by the steps which comprise the present invention, a preferred embodiment of which, illustrative of the best mode in which applicant has contemplated applying the principle, being set forth in detail in the following description and illustrated in the accompanying drawings, in which;

Figure 1 is a perspective view of a bar or billet blank from which the tapered plate is extruded;

Fig. 2 a longitudinal, sectional view of the extrusion dies and punch or plunger in which the extruded, tapered plate is formed, showing two bars or billets in position to be extruded;

Fig. 3 a similar view showing the parts at the beginning of the extrusion operation;

Fig. 4 a view similar to Fig. 2 taken as on the line 4—4, Fig. 2;

Fig. 5 a view similar to Figs. 2 and 3, at the end of the extrusion operation, showing two extruded tapered plates;

Fig. 6 a transverse section through the die and punch, taken as on the line 6—6, Fig. 3;

Fig. 7 a transverse section, taken as on the line 7—7, Fig. 5;

Fig. 8 an enlarged, transverse sectional view through the extruded plate;

Fig. 9 a transverse, sectional view through the plate, showing the first step of deforming the same;

Fig. 10 a similar view showing the second deforming step;

Fig. 11 a transverse sectional view showing the final deforming step;

Fig. 12 a front elevation of the tapered plate formed by the extrusion operation;

Fig. 13 a top edge view of the plate shown in Fig. 12;

Fig. 14 an edge elevation of the plate shown in Fig. 12;

Fig. 15 a longitudinal, sectional view through the formed propeller blade, taken as on the line 15—15, Fig. 16;

Fig. 16 a side elevation of the formed propeller blade;

Fig. 17 an enlarged, transverse, sectional view through the formed propeller blade, taken as on the lines 17—17 of Figs. 15 and 16;

Fig. 18 a similar view, taken as on the lines 18—18 of Figs. 15 and 16; and

Figure 19:
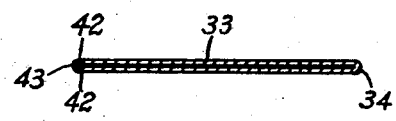

Fig. 19 a transverse section through the tip end portion of the formed blade, taken as on the lines 19—19, of Figs. 15 and 16.

In carrying out the invention to form a propeller blade by the method to which the invention pertains, a blank in the form of a rectangular bar or billet of steel or other suitable metal of proper dimensions is heated to extrusion temperature and in a single operation is extruded into a substantially flat plate, the wall section of which is tapered from the shank end toward the tip, an arcuate, longitudinal bend being formed through the median line of the blade in the extrusion operation, and spaced pairs of longitudinal ribs, tapered from the shank end toward the tip, being formed upon one side of the blade during the extrusion operation.

This extruded blade is then deformed by bending the plate upon each side of the median, arcuate bend, which forms the leading edge of the blade, and welding the contacting edges of the tapered ribs together, and welding the contacting edges of the plate together to form the trailing edge of the blade, thus forming a hollow blade of increasingly flatter elliptical cross section from the shank end toward the tip which may be entirely flattened and welded.

Referring now more particularly to the embodiment of the invention illustrated in the drawings, the bar or billet blank from which the tapered plate is extruded as indicated at 20, and as shown in perspective in Fig. 1, may be of a length substantially the width of the tapered plate to be formed and of suitable height and thickness to produce a tapered plate of the desired dimensions.

The dies for carrying out the extrusion operation are shown in Figs. 2, 3, 4 and 5 and comprise the block 21 having a bore 22 within which is slidably mounted the shank 23 of the punch 24, the die block 25 being associated with the lower or outer end of the block 21 and having the angular shoulder 26 to abut the lower end of a bar blank 20 when mounted in the bore 22 between one side of the punch 24 and the adjacent wall of said bore, as shown in Fig. 2.

As shown in the drawings, the dies may be so constructed that two blanks 20 may be placed therein, one on each side of the punch 24, beneath the shoulder 27 thereof, as best shown in Fig. 2, whereby two tapered plates may be simultaneously extruded with one operation of the punch.

The bore 28 of the die block 25 is outwardly flared beyond the shoulder 26, as indicated at 29, so as to provide a clearance for work as it is extruded through the die. The punch 24 is outwardly tapered, as shown, and is provided at its center with an arcuate rib 30 cooperating with the arcuate groove 31 in the portion 26 of the die block. Longitudinally upwardly tapered grooves 32 are formed in the sides of the punch, in equally spaced pairs, on opposite sides of the center.

In performing the extrusion operation, the blanks 20 are heated to extrusion temperature and placed in the die in the position shown in Fig. 2 and the punch is then moved downward through the die block to extrude the heated blanks through the die block to form extruded plates 33, uniformly tapered from the lower ends toward the upper ends thereof, with longitudinal, arcuate bends 34 at their median lines, and equally spaced pairs of uniformly tapered, longitudinal ribs 35 on opposite sides of the center.

As shown in Fig. 3, as the punch starts the downward movement the lower ends of the tapered plates are first formed of desired thickness, as indicated at 36, and due to the taper of the punch and the taper of the grooves 32 therein the plate will be uniformly tapered toward its upper end and the ribs 35 will also be uniformly tapered toward their upper ends, as best shown in Figs. 5, 12 and 14, and as indicated in Figs. 6 and 7.

At the completion of the extrusion operation the entire blank will have been extruded through the die with the exception of the small transverse rib 38 at the upper end of the plate, as shown in Figs. 5 and 12 to 14. This upper end of the plate is then cut off straight and the plate may then be deformed to produce a hollow propeller blade of increasingly flatter elliptical cross section from the shank nd toward the tip end thereof.

If the metal does not retain sufficient heat, after the extrusion operation, it may be heated to a temperature at which it may be easily deformed, and in the first step of the deforming operation opposite sides of the plate are bent toward each other until the first pair of the longitudinal ribs 35 contact with each other, as shown in Fig. 9.

As the edges of these ribs are bevelled, as indicated at 39, welding metal, as indicated at 40, may then be introduced by any suitable welding method, the sides of the plate being separated sufficiently to permit the welding operation to be carried out.

The next deforming step is illustrated in Fig. 10, the opposite sides of the plate being bent further toward each other until the next pair of ribs 35 contact with each other, at which time the welding metal 41 may be introduced between the bevelled edges of these ribs to weld them together.

In the final deforming step the opposite bevelled edges 42 of the plate 33 are brought into contact with each other, as shown in Fig. 11, and welding metal is introduced along this edge, as indicated at 43, forming the hollow, elliptic propeller blade, the rounded bend 34 forming the leading edge and the welded edge 43 the trailing edge thereof.

The propeller blade thus formed is of increasingly flatter cross sectional shape from one end toward the other, as best shown in Figs. 15 to 19, and the upper end of the propeller blade may be completely flattened, as best shown in Fig. 19, and may preferably be welded at this point.

After the hollow blade has thus been formed in the manner above described, and illustrated in the portions of the drawings referred to, any usual shank end may be welded to the thick end 36 of the propeller blade thus formed, for connection to the propeller hub in usual and well known manner.

From the above it will be obvious that a hollow propeller blade of uniformly flatter elliptical cross sectional shape, from the shank end toward the tip end thereof, and having a uniformly tapered wall thickness from the shank end toward the tip, may be produced in a small fraction of the time and at a small fraction of the cost, as compared with present practice.

According to the provisions of the patent statutes I have explained the principle of my invention and described one embodiment thereof, but I desire to have it understood that within the scope of the appended claims the invention may be practiced otherwise than as specifically illustrated and described, the invention residing in the extrusion of a uniformly tapered metal plate, with tapered ribs upon one side thereof, and the forming of said plate into a hollow propeller blade of increasingly flatter elliptical cross section from one end toward the other.

I claim:

1. The method of making a hollow, metal propeller blade, which consists in forming a substantially rectangular blank, heating the blank to extrusion temperature, extruding the blank into a plate of uniformly tapered wall thickness from one end toward the other end thereof and simultaneously extruding tapered, longitudinal ribs on one side of the plate, there being the same number of ribs on each side of the median line of the plate, the edges of the ribs being bevelled outwardly, the ribs on one side of the median line being spaced the same distance from the median line as the corresponding ribs on the opposite side, whereby when the plate is bent upon the median line corresponding ribs on each side of the median line will cooperate to form a pair, then deforming the tapered plate by first bending on both sides of the median line so that the edges of the first pair of ribs only contact with each other while the remaining portions of the plate are outwardly flared, then welding said first pair of ribs together by placing welding metal between the bevelled edges thereof, then further bending the plate until the edges of the next pair of ribs contact with each other, then welding said next pair of ribs together by placing welding metal between the bevelled edges thereof, then further bending the plate until the edges thereof contact with each other, and then welding the edges of the plate together to form a hollow blade of increasingly flatter elliptic cross sectional shape from the thicker end toward the thinner end of the plate.

2. The method of making a hollow, metal propeller blade as described in claim 1, which consists in flattening and welding the thinner end of the blade and welding a shank portion to the thicker end of the blade.

CHARLES A. BRAUCHLER.

REFERENCES CITED

The following references are of record in the file of this patent:

UNITED STATES PATENTS

| Number | Name | Date |
|---|---|---|
| 1,365,159 | Dicks | Jan. 11, 1921 |
| 2,231,750 | Damerell | Feb. 11, 1941 |
| 2,365,482 | Manken | Dec. 19, 1944 |
| 2,378,059 | Brauchler | June 12, 1945 |
| 2,392,336 | Nissen | Jan. 8, 1946 |
| 2,401,235 | Farr | May 28, 1946 |
| 2,401,542 | Booth | June 4, 1946 |
| 2,442,641 | Duncan | June 1, 1948 |

FOREIGN PATENTS

| Number | Country | Date |
|---|---|---|
| 386,518 | Great Britain | Jan. 19, 1933 |
| 332,011 | Italy | Nov. 21, 1935 |